United States Patent
Dreibholz et al.

(10) Patent No.: US 8,733,195 B2
(45) Date of Patent: May 27, 2014

(54) ACTUATING ASSEMBLY FOR A CENTRALLY SYNCRONISED DUAL-CLUTCH TRANSMISSION

(75) Inventors: Ralf Dreibholz, Meckenbeuren (DE); Eckhardt Luebke, Friedrichshafen (DE); Matthias Reisch, Ravensburg (DE); Juergen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 777 days.

(21) Appl. No.: 12/863,822

(22) PCT Filed: Feb. 20, 2009

(86) PCT No.: PCT/EP2009/052014
§ 371 (c)(1),
(2), (4) Date: Jul. 21, 2010

(87) PCT Pub. No.: WO2009/112344
PCT Pub. Date: Sep. 17, 2009

(65) Prior Publication Data
US 2011/0048150 A1    Mar. 3, 2011

(30) Foreign Application Priority Data
Mar. 13, 2008 (DE) .......................... 10 2008 000 637

(51) Int. Cl.
*F16D 23/06* (2006.01)
*F16H 3/093* (2006.01)

(52) U.S. Cl.
USPC ............................................. 74/339; 74/331

(58) Field of Classification Search
USPC ................ 74/331, 330, 340, 359, 339, 411.5; 475/3, 5, 151, 152, 154, 155
See application file for complete search history.

(56) References Cited

U.S. PATENT DOCUMENTS

| | | | | |
|---|---|---|---|---|
| 3,834,499 | A * | 9/1974 | Candellero et al. | 477/73 |
| 5,588,928 | A * | 12/1996 | Koivunen | 475/126 |
| 6,029,785 | A * | 2/2000 | Koivunen | 192/17 A |
| 6,698,303 | B2 | 3/2004 | Hoffmann et al. | |
| 6,978,692 | B2 * | 12/2005 | Thery | 74/372 |
| 7,066,305 | B2 * | 6/2006 | Grzesiak et al. | 188/77 W |
| 7,329,205 | B2 * | 2/2008 | Preisner et al. | 477/80 |
| 7,350,432 | B2 * | 4/2008 | Somschor et al. | 74/335 |

(Continued)

FOREIGN PATENT DOCUMENTS

| | | |
|---|---|---|
| DE | 199 50 679 A1 | 4/2004 |
| DE | 10 2004 002 045 A1 | 8/2005 |

(Continued)

OTHER PUBLICATIONS

Japanese Office Action issued in corresponding Japanese Application mailed on Apr. 16, 2013.

*Primary Examiner* — Troy Chambers
*Assistant Examiner* — Jude Agendia
(74) *Attorney, Agent, or Firm* — Davis & Bujold, PLLC; Michael J. Bujold

(57) ABSTRACT

An actuating assembly for actuating synchronizing elements of a centrally synchronized dual-clutch transmission having at least a first part-transmission (6) and a second part-transmission (7) such that at least one synchronizing element is associated with each of the first and the second part-transmission (6, 7). A common actuator (1) is provided for actuating at least the synchronizing elements of the two part-transmissions.

16 Claims, 4 Drawing Sheets

(56) References Cited

U.S. PATENT DOCUMENTS

| | | | |
|---|---|---|---|
| 7,387,590 B2 * | 6/2008 | Dreher | 477/77 |
| 7,472,616 B2 * | 1/2009 | Dreher et al. | 74/336 R |
| 7,765,886 B2 * | 8/2010 | Hori et al. | 74/343 |
| 8,220,606 B2 * | 7/2012 | Dreher | 192/3.56 |
| 8,418,575 B2 * | 4/2013 | Schneider et al. | 74/335 |
| 2005/0139035 A1 * | 6/2005 | Lee et al. | 74/661 |
| 2006/0040787 A1 * | 2/2006 | Dreher | 477/34 |
| 2007/0202991 A1 * | 8/2007 | Matsumura et al. | 477/174 |
| 2011/0036187 A1 * | 2/2011 | Reisch et al. | 74/331 |
| 2011/0113922 A1 * | 5/2011 | Pesola et al. | 74/665 A |

FOREIGN PATENT DOCUMENTS

| | | |
|---|---|---|
| DE | 10 2006 015 898 A1 | 10/2007 |
| EP | 1 400 731 A2 | 3/2004 |
| JP | 2002-267011 | 9/2002 |
| JP | 2003-525409 | 8/2003 |

* cited by examiner

ACTUATING ASSEMBLY FOR A CENTRALLY SYNCRONISED DUAL-CLUTCH TRANSMISSION

This application is a National Stage completion of PCT/EP2009/052014 filed Feb. 20, 2009, which claims priority from German patent application serial no. 10 2008 000 637.8 filed Mar. 13, 2008.

FIELD OF THE INVENTION

The present invention concerns an actuating assembly for the actuation of synchronizing means of a centrally synchronized dual-clutch.

BACKGROUND OF THE INVENTION

For example, from the document DE 10 2006 015 898 A1 a clutch device with a clutch and a transmission brake for an internal combustion engine with a transmission is known. The clutch device provided for actuating the clutch also comprises a transfer element by means of which to movement of the clutch can be transmitted mechanically to the transmission brake, so that individual control of the transmission brake is possible. Furthermore, from the document DE 10 2004 002 045 A1 a starting clutch system for a vehicle is known, which comprises a starting clutch and a transmission brake. The starting clutch and the transmission brake are actuated by an actuator. From the above documents, therefore, it is known that the actuator provided for actuating the clutch can also actuate a transmission brake.

In the centrally synchronized transmissions with only one transmission input shaft described above, it also follows that only one synchronizing means is provided on the transmission input shaft. In contrast, in centrally synchronized dual-clutch transmissions a synchronizing element is associated with each part-transmission and thus with each transmission input shaft. Accordingly at least two actuators are needed, each actuating one synchronizing element. As synchronizing means various designs are known, such as classical synchronizers or transmission brakes for the compensation of rotation speed differences. It is also possible that at each shift point synchronizing means equal in number to the loose wheels to be engaged are arranged. In this design variant further actuators are needed in order to actuate the synchronizing means at each shift point.

SUMMARY OF THE INVENTION

The purpose of the present invention is to propose an actuating assembly for a centrally synchronized dual-clutch transmission of the type described at the start, in which a particularly inexpensive and space-saving actuator system is provided.

Accordingly an actuating assembly is proposed for the actuation of synchronizing means in a centrally synchronized dual-clutch transmission with at least a first part-transmission and a second part-transmission, such that at least one synchronizing element is associated with each part-transmission. According to the invention it is provided that at least the synchronizing elements of the two part-transmissions can be actuated by a common actuator. Since only one actuator is required for both synchronizing elements, besides cost savings an advantage in terms of structural space occupation is also obtained. In addition, in the electric control unit for controlling the actuator as well, savings related to the space required and the production costs are achieved. It is also possible for further synchronizing means in the transmission to be actuated by the actuator.

In an advantageous further development of the invention it can be provided that depending on the respective direction of movement of the actuator away from its null position, the synchronizing element of the first part-transmission or the synchronizing element of the second part-transmission can be actuated. This gives the advantage of greater functional reliability of the dual-clutch transmission since in no case can both synchronizing elements be actuated at one and the same time. In this way the synchronizing elements can never act in opposition to one another. However, other control possibilities for the synchronizing means of the two part-transmissions are also conceivable.

According to a possible design of the invention, it can be provided that to transmit the movement direction of the actuator to the synchronizing element, at least one transmission means or suchlike is provided between the actuator and the respective synchronizing element concerned. For example, the so-termed 'combi-actuator' of the actuating assembly according to the invention can act by means of transmission elements on both of the two synchronizing elements. It is also possible for two transmission elements to be provided on the actuator, each acting upon a respective synchronizing element. As transmission means, mechanical, hydraulic, pneumatic or suchlike means can be used.

For example, an embodiment variant of the actuating assembly according to the invention can be provided with only one transmission element made as a component, the transmission element having at least one eccentric. In a preferred design variant two eccentrics are arranged on a shaft and thus, in combination, form a dual-eccentric shaft. The ends of the eccentrics are in each case connected to a movable end of the synchronizing element, for example made as a band brake. In this way the shaft with the eccentrics can actuate both synchronizing elements by means of the actuator. The dual-eccentric shaft can be designed such that the two eccentrics are aligned axially with one another. In this case the eccentrics can be formed as offset zones of the dual-eccentric shaft, which in the circumferential direction of the dual-eccentric shaft are arranged at a predetermined angle relative to one another. For example the eccentrics can be distributed around the circumference at an angle of approximately 180°. The eccentric shaft can be actuated, for example, by a segment of a toothed disk.

Another design variant of the actuating assembly according to the invention, for example with two transmission elements, can provide that as transmission elements a lever element or suchlike is associated with each synchronizing element for example made as a transmission brake, such that the two lever elements can be actuated by a common actuating element a toothed segment disk or suchlike driven by the actuator. The transmission elements can be coupled to the common actuating element by means of push-rods. In this design variant the actuator drives the lever elements constituting the transmission elements, which then each act separately on the respective synchronizing element concerned.

In the above embodiment variant a splined output shaft of an actuator in the form of an electric motor, can be engaged with teeth on the toothed segment disk, the rotational axle of the toothed segment disk being provided with receiving sections or suchlike, each of which is in active connection via an articulation lever or a push-rod with the associated lever element. Thus, depending on the rotational direction of the actuator, one or the other transmission brake can be actuated. For example, the pivot axle of each lever element can be fixed to the housing at the end remote from the toothed segment disk, on which the end of the transmission brake made as a band brake fixed to the housing is also held, such that the moving end of the band brake can be fixed for example to the respective lever element between the two ends. However, other designs are also conceivable.

Regardless of the particular design of the synchronizing elements and also of the actuator in the actuating assembly according to the invention, it can preferably be provided that each synchronizing element is associated with a gearwheel having the highest transmission ratio of the respective part-transmission. However, other possible arrangements are also conceivable. For example, the actuator can be arranged essentially axis-parallel to, or even perpendicularly to the countershafts of the dual-clutch transmission. Here too, other possible arrangements are conceivable.

To achieve a particularly great structural space advantage in the dual-clutch transmission, it can be provided that each synchronizing element is arranged concentrically with the respective control gear on one of the countershafts. Thus, the synchronizing elements can be accommodated in the same axial space, so that a structure with radial nesting one inside the other is possible.

The actuator provided for actuating the two synchronizing elements can be, for example, an electric motor in the form of a rotary or linear motor. It is also possible to use an electromagnet or a cylinder-piston unit as the actuator.

As synchronizing elements, for example at least one transmission brake and/or a clutch can be associated with each part-transmission. As transmission brakes, for example band brakes, disk brakes and/or cone brakes can be provided. When a transmission brake is used, the necessary brake drum, brake disk or break cone can be made integrally with the associated fixed or loose wheel. For the transmission brake, other designs too are conceivable.

As a clutch, for example a cone clutch, a disk clutch or suchlike can be provided. The shifting elements or shifting devices for gear selection can preferably be actuated from the shaft outward, by so-termed internal actuators. The shifting elements themselves can be claws or suchlike. Other shifting elements can also be used.

BRIEF DESCRIPTION OF THE DRAWINGS

Below, the invention is explained in more detail with reference to the drawings, which show.

DETAILED DESCRIPTION OF THE PREFERRED EMBODIMENTS

Figure 1:
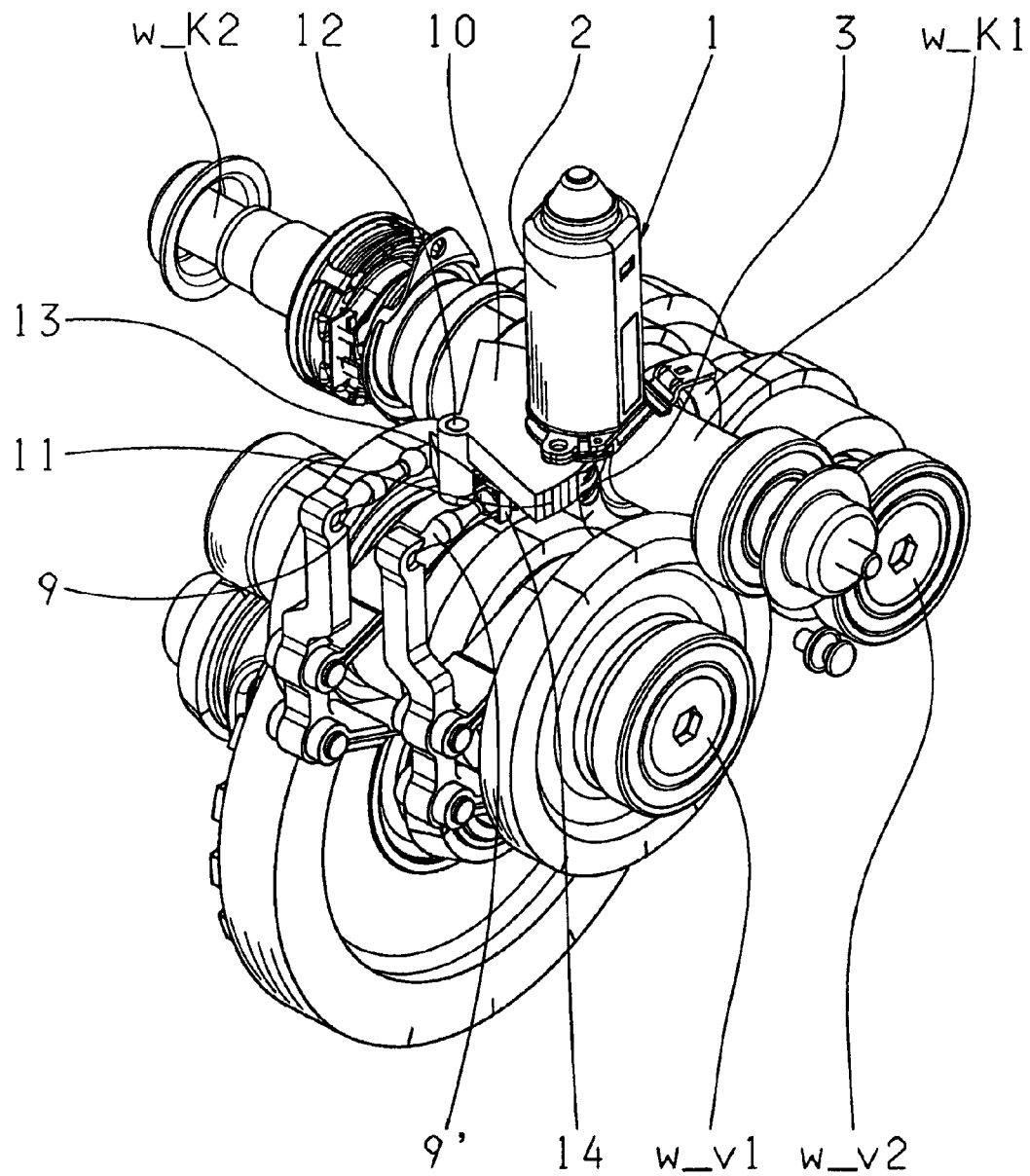
FIG. 1: Perspective partial view of a first design variant of an actuating assembly, with one actuator for actuating the synchronizing elements of both part-transmissions.

FIGS. 1 to 6 show various embodiment variants of an actuating assembly according to the invention for actuating synchronizing elements in a centrally synchronized dual-clutch transmission with a first part-transmission 6 and a second part-transmission 7, a synchronizing element being respectively associated with each of the part-transmissions 6, 7. Regardless of the specific design of the dual-clutch transmission, in the actuating assembly according to the invention it is provided that the two synchronizing elements of the part-transmissions 6, 7 can be actuated by means of a common actuator 1. Thus, the actuator 1 constitutes a 'combi-actuator', which can selectively actuate the transmission synchronizing elements of the part-transmissions 6, 7 connected in parallel.

Regardless of the specific design variant, the actuating assembly comprises as the actuator 1, designed as an electric motor 2, which drives an output shaft 3. As synchronizing elements transmission brakes in the form of band brakes 4, 5 are provided, the band brake 4 being associated with the first part-transmission 6 and the band brake 5 with the second part-transmission 7. The actuating assembly is designed in such manner that depending on the respective direction of movement of the actuator 1 away from its null position, the band brake 4 of the first part-transmission 6 or the band brake 5 of the second part-transmission 7 is actuated.

Figure 2:
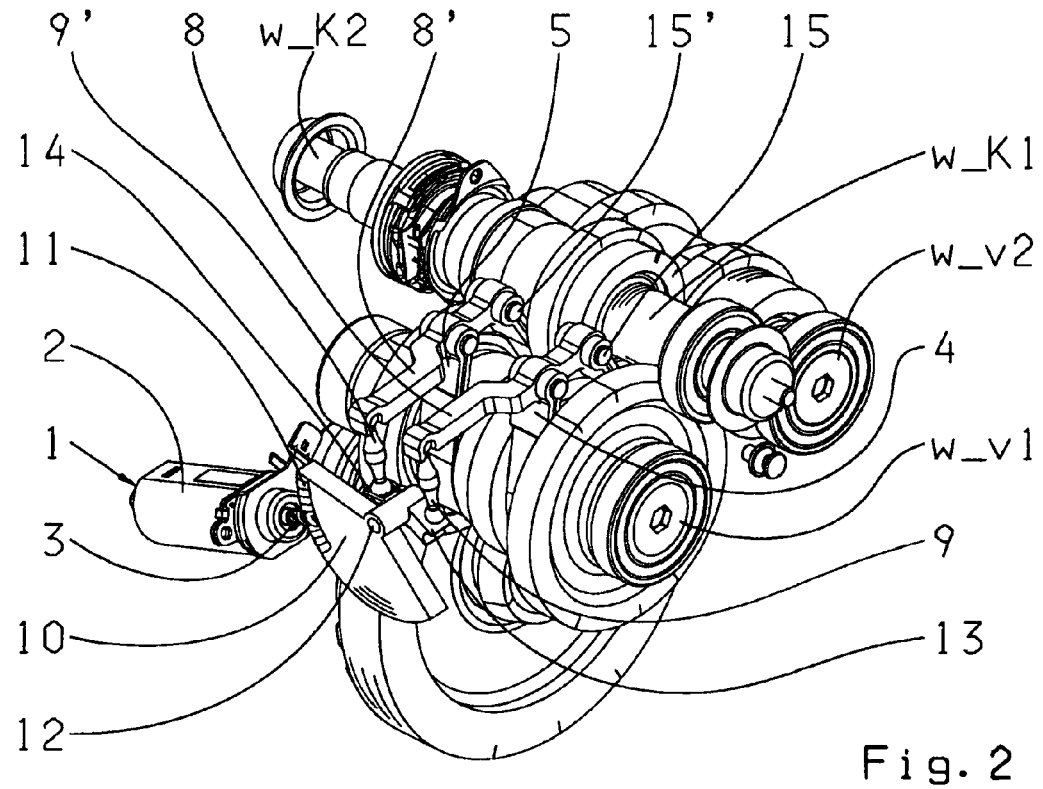
FIG. 2: Perspective partial view of the first design variant with an alternative arrangement of the actuator.

FIGS. 1 and 2 show a first possible embodiment variant of the actuating assembly according to the invention on the centrally synchronized dual-clutch transmission. In this first design variant, to transmit rotational movement of the electric motor 2 or its output shaft 3 to the respective band brakes 4, 5, two mechanical transmission elements are provided between the electric motor 2 and the band brakes 4, 5. Each transmission element comprises a lever element 8, 8', each of these being in active connection, via a push-rod 9, 9', with a toothed segment disk 10 driven by the output shaft 3 of the electric motor 2. The splined output shaft 3 of the electric motor 2 engages with teeth 11 of the toothed segment disk 10, and the rotational axle 12 of the toothed segment disk 10 is provided with receiving sections 13, 14 which, respectively, are in active connection via the push-rods 9, 9', with the ends of the respective lever elements 8, 8' pointing toward them. The end of each lever element 8, 8' facing away from the respective push-rod 9, 9' is mounted fixed on the housing as a pivot axis 15, 15'. The end of the respective lever element 8, 8' forming the pivot axis 15, 15' serves at the same time to receive the end of the respective band brake 4, 5 fixed to the housing. In each case the movable end or the end that can be acted upon to actuate the band brake 4, 5 is held on the respective lever element 8, 8' between the two ends. Thus, the associated band brake 4, 5 can be activated or tightened, or released or relaxed by pivoting the appropriate lever element 8, 8'.

In the first design variant shown in FIG. 1, the electric motor 2 is arranged approximately perpendicularly to the two countershafts w_v1, w_v2 and the transmission input shafts w_K1, w_K2 of the two part-transmissions 6, 7 of the dual-clutch transmission indicated as an example. The teeth 11 of the toothed segment disk 10 are provided radially on the outside of the circumference of the toothed segment disk 10.

In an alternative arrangement of the electric motor 2 shown in FIG. 2, the electric motor 2 is arranged approximately parallel or at a predetermined acute angle to the two countershafts w_v1, w_v2 and the transmission input shafts w_K1, w_K2 of the two part-transmissions 6, 7 of the dual-clutch transmission. In this version the teeth 11 of the tooth segment disk 10 are provided on the surface thereof.

Regardless of the specific arrangement of the actuator 1, in the first embodiment variant the receiving sections 13, 14 can be arranged approximately at an angle of 180° relative to one another on the circumference of the rotational axle of the toothed segment disk 10. Other angles too are conceivable.

Regardless of the specific design of the first embodiment variant shown in FIGS. 1 and 2, by selecting the rotational direction of the output shaft 3 of the electric motor 2 the toothed segment disk 10 is rotated to the left or to the right. Rotation of the toothed segment disk 10 actuates one or other of the push-rods 9, 9' in order to pivot the associated lever element 8, 8' around its pivot axis 15, 15' so that the associated movable end of the band brake 4, 5 moves with it, whereby the associated band brake 4, 5 is tightened or activated. Thus, depending on the rotational direction of the output shaft 3 of the electric motor 2, one or other of the band brakes 4, 5 can be actuated.

Figure 3:
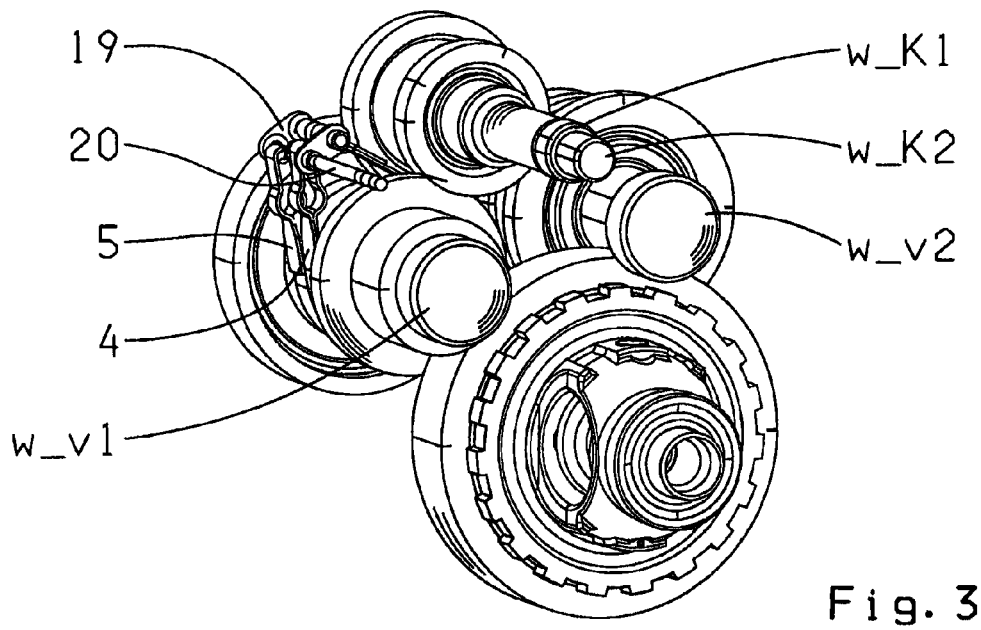
FIG. 3: Perspective partial view of a second design variant of the actuating assembly, with the actuator having only one transmission element for actuating the synchronizing elements of both part-transmissions.
Figure 4:
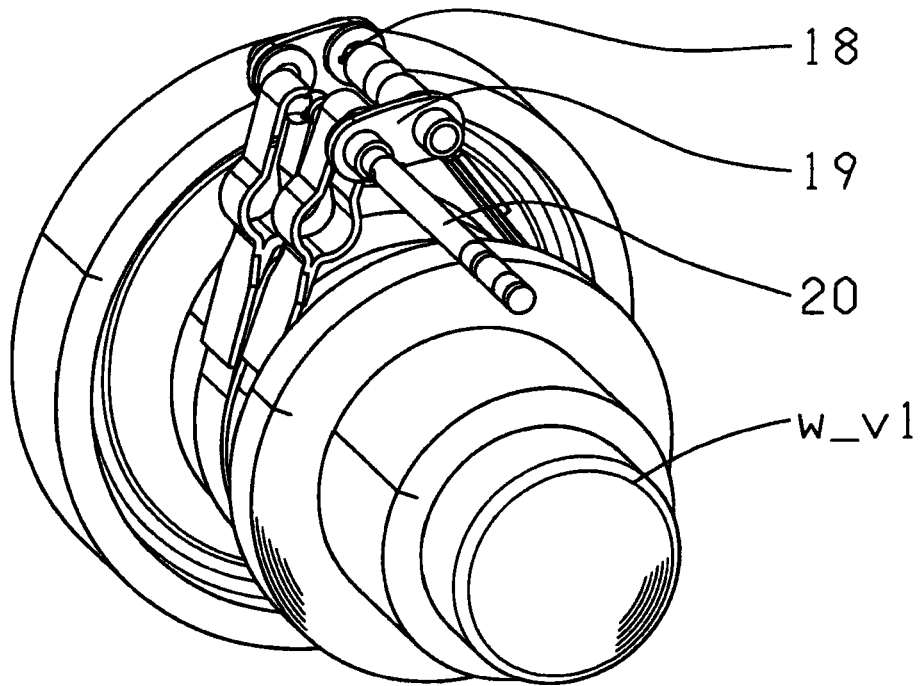
FIG. 4: Another perspective partial view of the second design variant.
Figure 5:
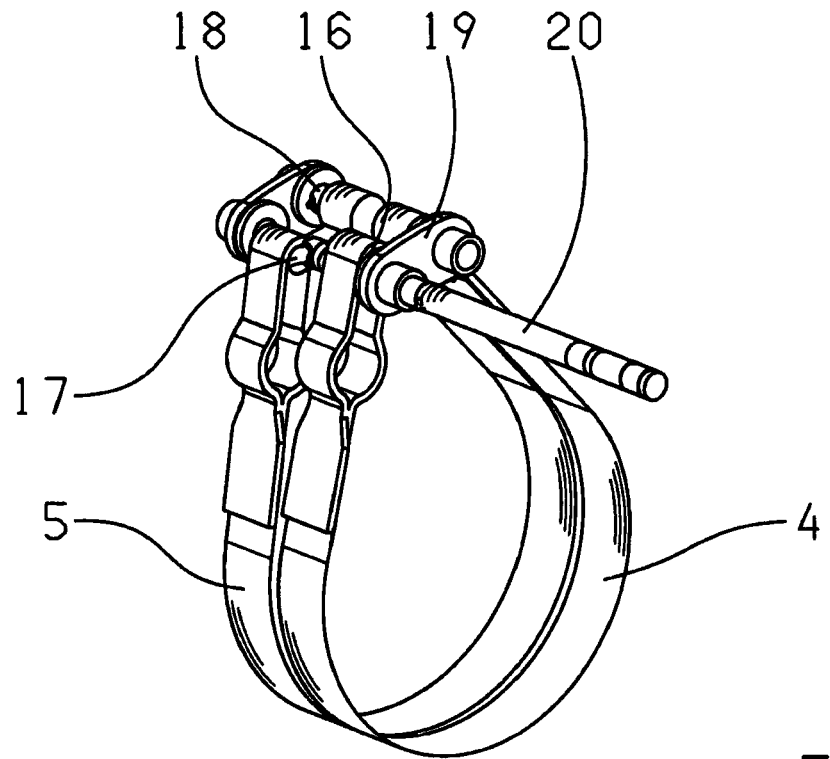
FIG. 5: Detailed perspective view of the synchronizing elements according to FIGS. 3 and 4, made as band brakes.

FIGS. 3 to 5 show views of a second possible embodiment variant, the same components being given the same indexes as in the first embodiment variant. In the second embodiment variant, to transmit the movement direction of the electric motor 2 to the band brakes 4, 5 only one transmission element is provided. As the transmission element a dual-eccentric shaft 20 is provided, whose eccentrics 16, 17 are respectively connected to the movable ends of the respective band 4, 5. The ends of the band brakes 4, 5 fixed to the housing are attached to a bearing bolt 18 which is held with its ends in holding bushes of a supporting unit 19. The dual-eccentric shaft 20 is mounted so that it can rotate in the supporting unit 19.

The two eccentrics 16, 17 of the dual-eccentric shaft 20 are arranged one behind the other in the axial direction, and offset relative to one another by an angle of approximately 180° in the circumferential direction. Other angles too are possible. The end of the dual-eccentric shaft 20 remote from the band brakes 4, 5 is in active connection with the output shaft 3 of the electric motor 2 in a manner not illustrated in detail.

From FIG. 5 in particular it can be seen that when the output shaft 3 of the electric motor 2 and hence the dual-eccentric shaft 20 is rotated to the right, the band brake 4 is released by the corresponding movement of the eccentric 16 and the band brake 5 is tightened by the corresponding movement of the eccentric 17. When the output shaft 3 of the electric motor 2 and hence the dual-eccentric shaft 20 rotates to the left, the band brakes 4, 5 oppositely are actuated.

Figure 6:
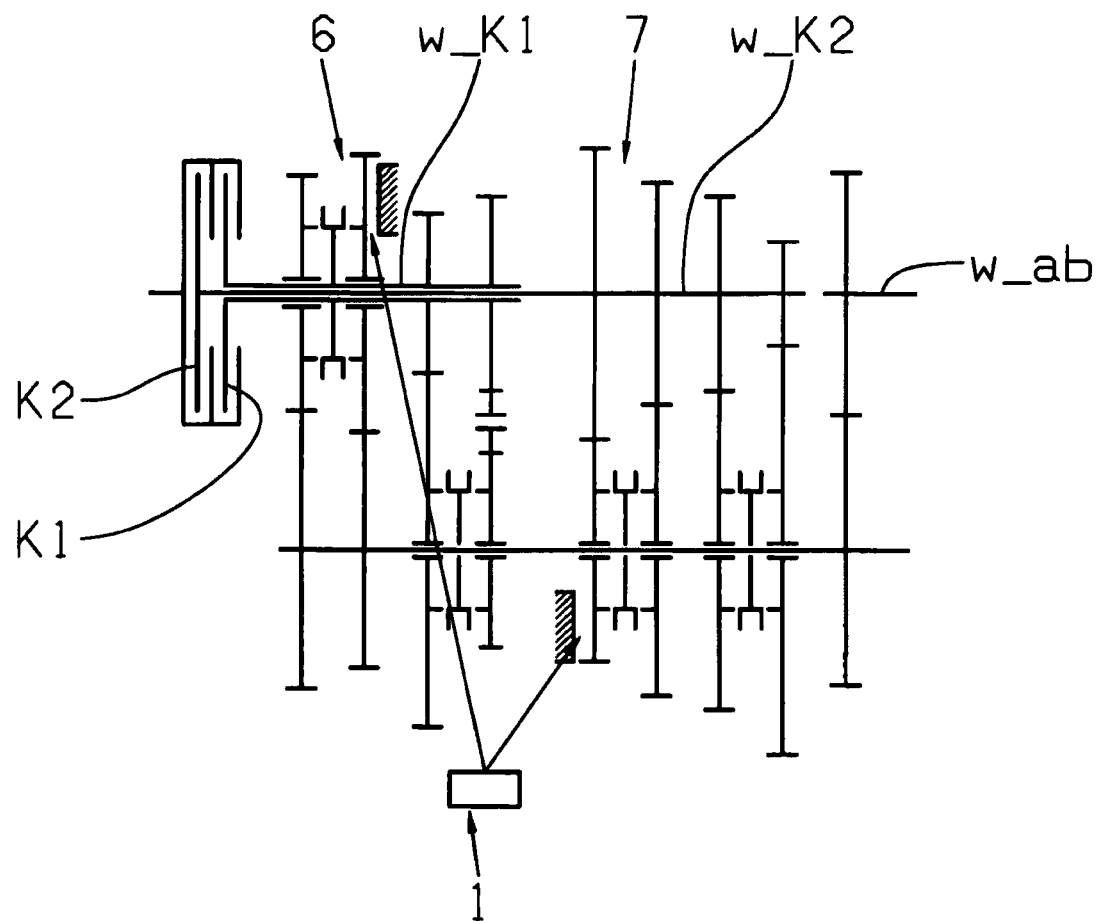
FIG. 6: Schematic representation of the principle of a dual-clutch transmission with possible fitting locations of the synchronizing elements on the two part-transmissions.

FIG. 6 shows a schematic representation of the principle of a possible dual-clutch transmission, indicating the fitting location of the synchronizing elements on the two part-transmissions 6, 7. This representation shows that in each case the synchronizing elements are associated with the gearwheel of the highest gear of the part-transmission 6, 7 concerned. In the manner described above, the synchronizing elements are actuated by the schematically indicated actuator 1. The arrows extending from the actuator 1 indicate the respective fitting locations of the synchronizing elements and are intended schematically to represent the transmission elements. Besides the various transmission ratio steps of the transmission, the transmission input shaft w_K1 associated with the first part-transmission 6, which is associated with the clutch K1, and the transmission input shaft w_K2 associated with the second part-transmission 7, which is associated with the clutch K2, and the drive output shaft w_ab are shown.

Regardless of whether the band brakes 4, 5 are actuated by the lever elements 8, 8' or by the dual-eccentric shaft 20, during actuation on the run-in side of the brake band a self-reinforcing effect takes place and a smaller braking force is therefore needed, so that the band brakes 4, 5 are more sensitive to frictional coefficient. When the actuation takes place on the run-out side of the brake band there is no self-reinforcement, so higher braking forces are needed and the band brakes 4, 5 are then less sensitive to frictional coefficient. Consequently, better adjustment of the braking force can take place if necessary. Regardless of the particular embodiment variant concerned, a suitable friction lining is fixed to the brake band of each band brake 4, 5. Regardless of the mode of actuation, a restoring element can be provided between the actuating device and the band brakes 4, 5 in order to ensure a clearance at the brake band. As the restoring element, for example a restoring spring or suchlike can be used. Other adjustment elements too can be used.

INDEXES

1 Actuator
2 Electric motor
3 Output shaft
4 Band brake
5 Band brake
6 First part-transmission
7 Second part-transmission
8, 8' Lever element
9, 9' Push-rod
10 Toothed segment disk
11 Gearteeth
12 Rotation axle of the toothed segment disk
13 Receiving section
14 Receiving section
15, 15' Pivot axis of the lever element
16 Eccentric
17 Eccentric
18 Bearing bolt
19 Supporting unit
20 Dual-eccentric shaft
w_K1 First transmission input shaft
w_K2 Second transmission input shaft
w_v1 First countershaft
w_v2 Second countershaft
K1 Clutch
K2 Clutch
w_ ab Drive output shaft

The invention claimed is:

1. An actuating assembly for actuation of a synchronization unit of a centrally synchronized dual-clutch transmission with at least a first part-transmission (6) and a second part-transmission (7) such that a synchronizing element is associated with each of the first and the second part-transmissions (6, 7), and a common actuator (1) actuating at least the synchronizing elements of the first and the second part-transmissions, the common actuator being movable, from a null position, in one of a linear and a rational first direction and an opposite second direction such that the synchronizing element of the first part transmission is actuated by movement of the common actuator in the first direction away from the null position and the synchronizing element of the second part transmission is actuated by movement of the common actuator in the second direction away from the null position.

2. The actuating assembly according to claim 1, wherein at least one transmission element connects the common actuator (1) and the respective synchronizing element concerned, and transmits movement of the common actuator (1) to the respective synchronizing element concerned.

3. The actuating assembly according to claim 2, wherein the transmission element is two lever elements (8, 8'), each lever elements (8, 8') is associated with one synchronizing element, and the two lever elements (8, 8') are, in each case, actuatable via a push-rod (9, 9') by a toothed segment disk (10) driven by the common actuator (1).

4. The actuating assembly according to claim 3, wherein the common actuator (1) is an electric motor (2) and comprises a splined output shaft (3) which engages with teeth (11) of a toothed segment disk (10), and a rotational axle (12) of the toothed segment disk (10) is provided with receiving sections (13, 14) which are, respectively, in active connection with the associated lever elements (8, 8') via the push-rods (9, 9').

5. The actuating assembly according to claim 4, wherein pivoting axles (15, 15') of the respective lever elements (8, 8') are fixed, at an end remote from the toothed segment disk (10), to a housing.

6. The actuating assembly according to claim 5, wherein an end of the synchronizing element made as a band brake (4, 5), fixed to the housing, is held at another end of each lever element (8, 8') such that a movable end of the band brake (4, 5) is attached to the respective lever element (8, 8') between the two ends.

7. An actuating assembly for actuation of a synchronization unit of a centrally synchronized dual-clutch transmission with at least a first part-transmission (6) and a second part-transmission (7) such that a synchronizing element is associated with each of the first and the second part-transmissions (6, 7),
- a common actuator (1) actuating at least the synchronizing elements of the first and the second part-transmissions, the common actuator being movable, from a null position, in a first direction and a second direction such that the synchronizing element of the first part transmission is actuated by movement of the common actuator in the first direction, away from the null position, and the synchronizing element of the second part transmission is actuated by movement of the common actuator in the second direction, away from the null position,
- at least one transmission element connects the common actuator (1) and the respective synchronizing element concerned, and transmits movement of the common actuator (1) to the respective synchronizing element concerned, and
- the transmission element is a dual-eccentric shaft (20) which rotates about a rotational axis and comprises at least two eccentrics (16, 17) that are respectively connected, in each case, to a movable end of one of the synchronizing elements which is made as a band brake (4, 5).

8. The actuating assembly according to claim 7, wherein the synchronizing elements are, in each case, associated with a gearwheel of the respective first and the second part-transmissions (6, 7) with a highest transmission ratio.

9. The actuating assembly according to claim 7, wherein the actuator (1) is arranged either substantially parallel or perpendicular to countershafts (w_v1, w_v2) and transmission input shafts (w_K1, w_K2) of the part-transmissions (6, 7).

10. The actuating assembly according to claim 7, wherein each of the synchronizing elements is arranged concentrically with a respective internal shifting device on a countershaft (w_v1, w_v2).

11. The actuating assembly according to claim 7, wherein the common actuator (1) is one of an electric motor (2), an electromagnet unit and a cylinder-piston unit.

12. The actuating assembly according to claim 7, wherein the common actuator (1) is either an electric rotary motor or an electric linear motor.

13. The actuating assembly according to claim 7, wherein each part-transmission (6, 7) is associated with at least one of a respective transmission brake and a clutch as the synchronizing element.

14. The actuating assembly according to claim 13, wherein the transmission brake is one of a band brake (4, 5), a disk brake and a cone brake.

15. The actuating assembly according to claim 13, wherein the clutch is at least one of a cone clutch and a disk clutch.

16. An actuating assembly for synchronizing a centrally synchronized dual-clutch transmission with at least a first part-transmission (6) and a second part-transmission (7), the assembly comprising:
- a first band brake (4) for synchronizing the first part-transmission (6);
- a second band brake (5) for synchronizing the second part-transmission (7);
- an electric motor (2) comprising an output shaft (3) which engages and rotationally drives a toothed disk segment (10) about an axle (12) in first and second rotational directions;
- first and second transmission elements, each engaging the toothed disk segment (10) and one of the first and the second band brakes (4, 5) such that as the toothed disk segment (10) rotates in the first rotational direction, the toothed disk segment (10) drives the first transmission element which actuates the first band brake (4) to synchronize the first part-transmission (6) and as the toothed disk segment (10) rotates in the second rotational direction, the toothed disk segment (10) drives the second transmission element which actuates the second band brake (5) to synchronize the second part-transmission (7).

* * * * *